Nov. 5, 1963   G. D. BALDWIN   3,109,597
SELF-ACTIVATED COMPARTMENT LIGHT
Filed Aug. 10, 1960   2 Sheets-Sheet 1
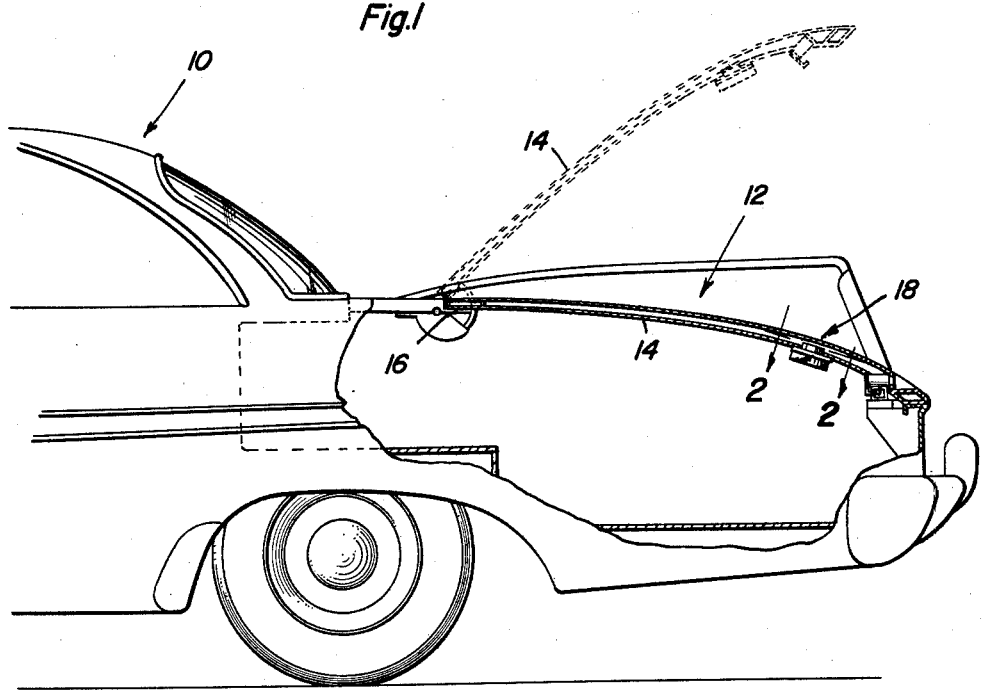
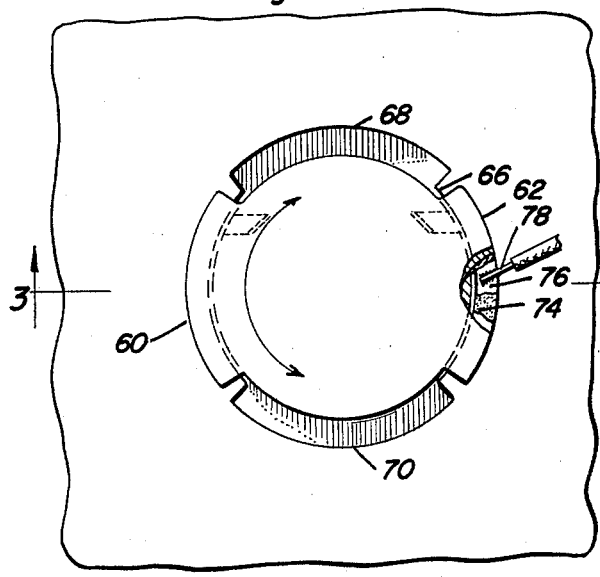
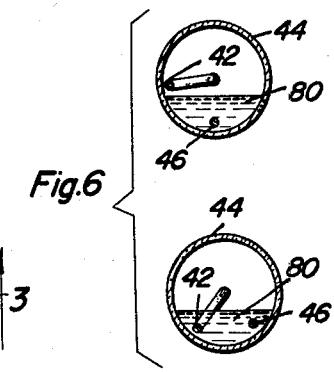
George D. Baldwin
INVENTOR.

Nov. 5, 1963  G. D. BALDWIN  3,109,597
SELF-ACTIVATED COMPARTMENT LIGHT
Filed Aug. 10, 1960  2 Sheets-Sheet 2
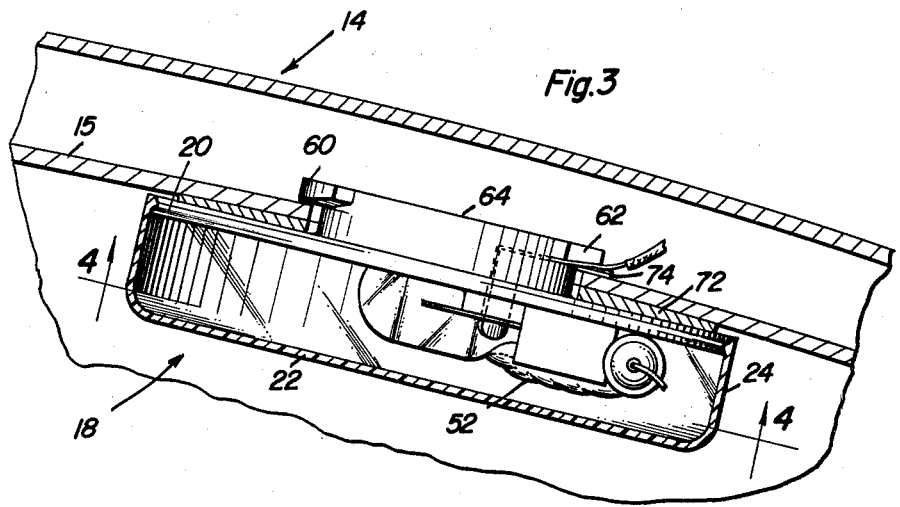
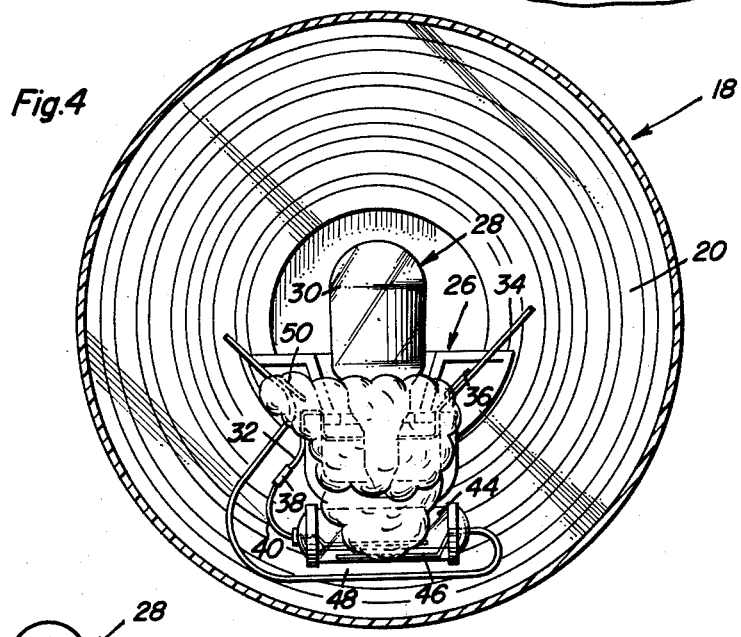
George D. Baldwin
INVENTOR.

United States Patent Office 3,109,597
Patented Nov. 5, 1963

3,109,597
SELF-ACTIVATED COMPARTMENT LIGHT
George D. Baldwin, Jamestown, N.Y., assignor to Truck-Lite Co., Inc., Jamestown, N.Y., a corporation of New York
Filed Aug. 10, 1960, Ser. No. 48,728
2 Claims. (Cl. 240—7.1)

This invention relates generally to vehicle illuminating means, and more particularly to a compartment or trunk light adapted to be utilized in an automobile for automatically becoming illuminated upon opening of a member hinged about a horizontal axis as, for example, an automobile trunk lid.

Conventional automobile trunk lights usually employ mercury tubes which automatically energize a light when the trunk lid is hinged to an open position. Although automobiles do not usually come from the factory equipped with trunk lights, it is a relatively easy matter to fasten a light provided for such purpose to the trunk by screws or other fastening means and connecting the light leads to provide conductors. It has been found that inasmuch as vehicles are often subjected to severe vibration, the compartment lights including the trunk lights often fail to operate properly. In view of this, it is the principal object of this invention to provide a novel mounting light construction adapted to be mounted in a vehicle compartment, as, for example, a trunk, for automatically energizing the light when the trunk lid is opened. More particularly, it is an object of the invention to provide a novel compartment light which is constructed in such a manner that vibrations will not cause it to break down, assuring a durable trouble-free life.

It is a more particular object of this invention to provide a novel vehicle compartment light construction which may be mounted in a compartment with a minimum of effort and which is relatively inexpensive to manufacture. The invention contemplates the provision of a throwaway type light which is completely sealed for minimizing adverse effects such as weather thereon.

It is also an important object of this invention to provide a novel light construction wherein a reflector is utilized having an unbased bulb mounted thereon. The bulb includes an envelope having filament leads extending therefrom with one of the leads serially connected to a mercury tube. A resilient epoxy potting material mechanically bonds the bulb to the reflector and the leads to provided terminals so as to minimize the adverse effects of vibrations provide flexibility in mounting the bulb to position it relative to the reflector in an optically optimum position for each installation.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a fragmentary side elevational view partially broken away illustrating the manner in which the compartment light comprising this invention is mounted on a trunk lid of a conventional automobile;

FIGURE 2 is an enlarged sectional view taken substantially along the plane 2—2 of FIGURE 1;

FIGURE 3 is a sectional view taken substantially along the plane 3—3 of FIGURE 2;

FIGURE 4 is a sectional view taken substantially along the plane 4—4 of FIGURE 3;

FIGURE 5 is a schematic wiring diagram illustrating how the light is energized through the mercury tube; and FIGURE 6 is an enlarged representative sectional view illustrating the positions assumed by the mercury tube when the trunk lid is in a closed and an open position.

With continuing reference to the drawings, numeral 10 generally indicated a conventional automobile which is provided with a trunk compartment 12 in the rear thereof. The trunk compartment is generally closed by a trunk lid 14 which is hinged at 16. FIGURE 1 illustrates the trunk lid 14 in a normally closed position in full lines, while the dotted line illustration shows how the trunk lid 14 may be hinged so as to allow access to the trunk compartment 12. It of course is often desirable to provide illuminating means within the compartment 12. For this purpose, a compartment light 18, comprising this invention, is mounted on the trunk lid 14.

The compartment light 18 includes a reflector 20 and a cover plate 22 having an annular flange 24 which is secured to the reflector 20. The cover plate 22 is constructed of light transmitting material. The reflector 20 may be provided with a plurality of concentric sections as illustrated for providing a reflector focal point. The reflector 20 and closure plate 22 are each formed of non-corrosive plastic.

Integrally formed with the reflector 20 is a guide assembly 26. The guide assembly 26 receives an unbased bulb 28 including a glass envelope 30 therein. The guide assembly 26 defines recesses for properly seating the envelope 30 of the bulb 28. Filament leads 32 and 34 extend from the envelope 30. The lead 34 is engaged with and soldered or welded to terminal 36. Lead 32 is connected through connector 38 to wire 40 which in turn is electrically joined to electrode 42 in tube 44. Electrode 46 is also disposed in tube 44 and spaced from electrode 42. Wire 48 extends from electrode 46 and is engaged with and soldered or welded to terminal 50.

In order to mechanically bond the bulb 28 to the reflector 20 and protect the connections formed by lead 34 and terminal 36, and wire 48 and terminal 50, a resilient epoxy potting compound 52 is provided. The epoxy compound 52 is received within the various crevices of the guide assembly 26 to secure the bulb 28 so as to prevent any relative movement or vibration between the bulb 28 and the reflector 20. The potting compound 52 should preferably have the same coefficient of expansion as the glass envelope 30 of the bulb 28 to prevent any loosening of the bulb fastening due to changes in temperature.

The terminals 36 and 50 extend through the reflector 20 and are connected to metal coatings formed on camming ears 60 and 62 of boss 64 projecting from the rear of reflector 20. The trunk lid 14 is preferably provided with an opening 66 which is of a shape identical to the boss 64 and ears 60 and 62 of the light construction 18. The opening 66 includes recesses 68 and 70 through which the ears 60 and 62 may extend. By projecting the ears 60 and 62 through the opening in alignment with the recesses 68 and 70, the ears 60 and 62 may be placed behind the wall 15 of the lid 14. By rotating the light construction 18, the ears 60 and 62 may be moved out of alignment with the recesses 68 and 70 so as to cause the wall 15 of lid 14 to be positioned between the ears and the rear surface of the reflector 20. If desired, a compressible washer 72 may be disposed between the rear surface of the reflector 20 and the wall 15.

Adjacent the opening 66, and insulated from the wall 15 by an insulative strip 74 is a contact 76. A conductor 78 is connected to the contact 76 and in turn may be connected to the ungrounded side of the automobile electrical system.

In installing the light 18, it is merely necessary to pass the ears 60 and 62 through the recesses 68 and 70 of the opening 66 and turn the light construction 18 so as to engage the metal covering of one of the ears 60 or 62 with the contact 76. The other ear will automatically be electrically grounded to the wall 15 of the trunk lid 14. As noted, inasmuch as the metal coverings of the ears 60 and 62 are connected to the terminals 50 and 36, the filament in the envelope 30 of the bulb 28 will become energized whenever the mercury 80 in the tube 44 bridges electrodes 42 and 46. Attention is called to FIGURE 6 wherein the upper portion of the illustration shows a cross-section of the mercury tube when the trunk lid 14 is closed in the solid line position in FIGURE 1 so that the mercury 80 does not bridge the electrodes 42 and 46. When the lid 14 is raised to the dotted line position in FIGURE 1, the mercury 80 bridges the electrodes 42 and 46 so as to energize the bulb 28. Inasmuch as the epoxy potting compound 52 prevents relative movement between the bulb 28 and reflector 20, long and trouble-free life for the light construction 18 is assured. It will be appreciated that in order to replace the light construction 18 when it no longer properly functions, it is merely necessary to twist the light construction 18 so as to align the ears 60 and 62 with the recesses 68 and 70 of the opening 66 and withdraw the boss 64 and ears 60 and 62 through the opening in the wall 15.

From the foregoing it should be appreciated that the invention presents an advance in the illumination art inasmuch as it provides a unitary lamp construction including an unbased bulb and mercury tube secured to a reflector by an epoxy potting compound which mechanically retains the bulb in prepositioned relationship with respect to the reflector. Proper prepositioning of the bulb at the time of assembly assures that the filament projects at its greatest efficiency by being parallel to the lens at all times. Also it is to be noted that because the filament is in a vertical position, the lamp will be attached or cammed to the vertical with the bulb always in the most advantageous position for longest filament life under rough service. The mechanical bonding of the bulb to the reflector reduces undesirable vibration and relative movement between the bulb and the means upon which it is mounted. Potting makes the bulb and reflector a unitized part thereby eliminating the usual movement or whip of a bulb such as is encountered in the J-slot socket type holders.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in combination with vehicles, a light construction adapted to be mounted on a movable member, comprising, a reflector, an unbased bulb including a transparent rigid envelop having filament leads projecting therefrom, terminals extending through said reflector engaged with said leads, a position responsive switch electrically connected to said filament leads and terminals, and a resilient potting material having substantially the same thermal expansion property as said envelop received over a base portion of said envelop, said leads, said terminals and said switch securing said bulb and switch to said reflector for operation in response to movement of the movable member.

2. A vehicle mounted illumination device comprising a reflector, position responsive switch means and a bulb device electrically connected to the switch means, said bulb device having a light producing filament enclosed within a transparent rigid envelop having a base portion from which filament leads extend in spaced relation on opposite sides of the bulb device, guide means fixedly mounted on the reflector for positioning said base portion of the envelop on the reflector in spaced relation to the outer portions of the filament leads and the switch means, terminal means projecting from the reflector on opposite sides of the bulb device for electrical contact with said switch means and said filament leads positioned by the guide means, and resilient potting means having thermal expansion properties substantially equal to that of the envelop embedding the base portion of the envelop within the guide means, the filament leads and the position responsive switch means in permanent contact with the terminal means to protectively secure the bulb device and the switch means to the reflector whereby the deleterious effects of vibration are reduced and the optimum position of bulb device and switch means for operation and illumination is preserved.

References Cited in the file of this patent

UNITED STATES PATENTS

| 2,101,277 | Wappler | Dec. 7, 1937 |
| 2,198,077 | Curtis | Apr. 23, 1940 |
| 2,683,766 | Cunningham | July 13, 1954 |
| 2,686,868 | Diedring | Aug. 17, 1954 |
| 2,688,688 | Holtz | Sept. 7, 1954 |
| 2,736,005 | Craddock | Feb. 21, 1956 |
| 2,853,595 | Baldwin | Sept. 23, 1958 |
| 2,870,298 | Swager | Jan. 20, 1959 |
| 2,922,875 | Buck | Jan. 26, 1960 |
| 3,044,151 | Coler | July 17, 1962 |

OTHER REFERENCES

Publication "Modern Plastics," October 1952, page 91.